United States Patent Office 2,766,271
Patented Oct. 9, 1956

2,766,271

HYDROXYLATED PHENYL DERIVATIVES OF
β-(CARBOXYPHENYL) ACRYLONITRILES

Kurt J. Rorig, Evanston, Ill., assignor, by mesne assignments, to G. D. Searle & Co., Skokie, Ill., a corporation of Delaware No Drawing. Application December 8, 1953,
Serial No. 397,056

7 Claims. (Cl. 260—465)

This invention relates to a new group of phenolic nitriles and, specifically, to the α-(hydroxyphenyl) and α-(polyhydroxyphenyl) derivatives of β-(carboxyphenyl)acrylonitriles of the general structural formula

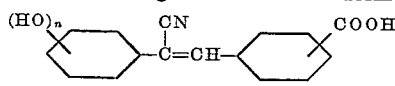

wherein $n$ is one or two.

My application is a continuation-in-part of my copending application, Serial Number 370,635, filed July 27, 1953, which has issued on June 15, 1954, as U. S. Patent 2,681,359, and which relates to phenolic dinitriles of the structural formula

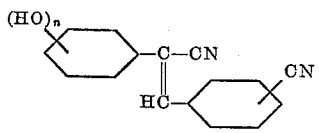

As indicated in the said application, the carboxyphenyl compounds claimed in the present application can be obtained from these cyanophenyl compounds and the corresponding methyl ethers of the structural formula

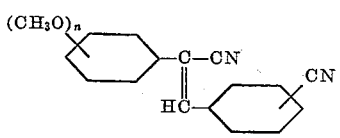

by selective hydrolysis of the aromatic cyano radical. The selective hydrolysis of the cyanophenyl group is apparently possible due to the fact that the aliphatic nitrile group is shielded by the β-aryl group.

The compounds of my invention possess valuable hormonal and cardiovascular effects, especially, because they antagonize the hypertensive effects of desoxycorticosterone. They are also valuable as intermediates in organic synthesis. Thus, they can be converted by conventional methods to derivatives of the structural formula

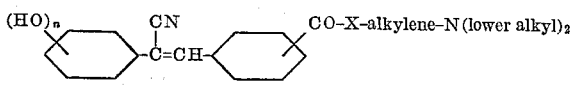

wherein X is an —O— or —NH— radical. These basic esters and amides have valuable spasmolytic and cardioregulatory actions.

The following examples illustrate in detail certain other compounds which comprise this invention and methods for producing same. However, this invention is not to be construed as limited in spirit or in scope thereby. It will be apparent to those skilled in the art that many modifications in materials and methods may be made without departing from the invention. In each of these examples, temperatures are given in degrees centigrade (° C.), relative amounts of materials in parts by weight and pressures during vacuum distillation in millimeters (mm.) of mercury.

Example 1

A mixture of 131 parts of p-cyanobenzaldehyde and 133 parts of p-hydroxytolunitrile in 400 parts of methanol is treated with a solution of 54 parts of sodium methoxide in 430 parts of methanol. Within a short time a yellowish product precipitates. The mixture is slurried while a stream of gaseous hydrogen chloride is passed through it to liberate the free phenolic compound. A mixture of this product and sodium chloride is collected on a filter. The sodium chloride is removed by washing with water. Upon repeated recrystallization of the organic residue from absolute ethanol, the α-(p-hydroxyphenyl)-β-(p-cyanophenyl) acrylonitrile melts at about 219–220° C. The infrared spectrum shows characteristic maxima at 2.80, 4.48, 6.26, and 11.94 microns.

Example 2

Upon addition of a solution of 54 parts of sodium methoxide in 430 parts of methanol to a solution of 131 parts of p-cyanobenzaldehyde and 147 parts of p-methoxytolunitrile in 400 parts of methanol, an almost instantaneous precipitation of a yellow product begins. This product turns brown on standing in the alkaline solution but becomes yellow once more on coming in contact with air. The precipitate is collected on a filter and washed with methanol to yield a yellow solid. After successive recrystallizations from ethanol and acetone the α-(p-anisyl)-β-(p-cyanophenyl)acrylonitrile is obtained in very slender, lemon-colored needles melting at about 174–175° C.

Example 3

A suspension of 56.5 parts of α-(p-anisyl)-β-(p-cyanophenyl)acrylonitrile in 2000 parts of methanol is heated at reflux and treated with a gaseous stream of hydrogen chloride for 3½ hours. 100 parts of water are added and refluxing is continued for 15 minutes. The hot reaction liquors are filtered and the precipitate is collected and recrystallized from a minimal amount of methanol. The methyl ester of α-(p-anisyl)-β-(p-carboxyphenyl) acrylonitrile thus obtained melts at about 129–130° C. It has the structural formula

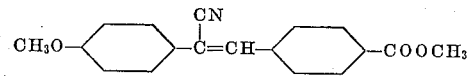

Example 4

A mixture of 10 parts of the methyl ester of α-(p-anisyl)-β-(p-carboxyphenyl)acrylonitrile is refluxed with 40 parts of freshly distilled pyridine hydrochloride for 45 minutes and then poured onto 750 parts of ice water. The flocculent, yellow precipitate is collected on a filter, washed with water, dried and recrystallized from hot dioxane. The α-(p-hydroxyphenyl)-β-(p-carboxyphenyl)-acrylonitrile is thus obtained in yellow needles which melt at about 293–295° C. It has the structural formula

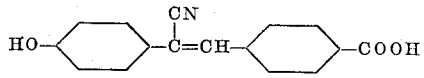

Example 5

A solution of 83 parts of m-chlorobenzaldehyde, 90 parts of p-methoxytolunitrile and 32 parts of sodium methoxide in 1350 parts of methanol and 250 parts of water is stirred until the precipitation of the yellow condensation product is essentially complete. The precipitate is collected on a filter and recrystallized from dilute ethanol. α-(p-methoxyphenyl) - β - (m-chlorophenyl) acrylonitrile is thus obtained in the form of pale yellow needles which melt at about 67–68° C.

Example 6

A mixture of 54 parts of α-(p-methoxyphenyl)-β-(m-chlorophenyl)acrylonitrile and 54 parts of cuprous cyanide are refluxed in 550 parts of quinoline for 12 hours. The dark brown homogeneous solution is poured onto 8500 parts of concentrated hydrochloric acid and extracted with chloroform. The extract is washed with water and concentrated to dryness in vacuo on a steam bath.

50 parts of the crude α-(p-methoxyphenyl)-β-(m-cyanophenyl)acrylonitrile thus obtained are refluxed in 2000 parts of methanol for 4 hours while a steady stream of dry hydrogen chloride gas is bubbled through the suspension. The reaction liquors are concentrated to one-third of their original volume in vacuo and chilled. The precipitated yellow α-(p-methoxyphenyl) - β - (m - carbomethoxyphenyl)acrylonitrile is filtered off. This ester shows infrared maxima at 4.48, 5.82, 6.26, 6.60, 7.77, 8.4 and 9.6 microns. It has the structural formula

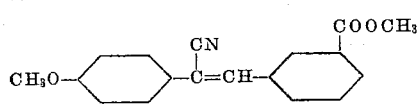

Example 7

A mixture of 30 parts of α-(p-methoxyphenyl)-β-(m-carbomethoxyphenyl)acrylonitrile and 250 parts of freshly distilled pyridine hydrochloride is refluxed for 35 minutes and then poured immediately onto 2000 parts of ice water. The flocculent, yellow precipitate is collected on a filter, dried and recrystallized from dioxane to yield α - (p-hydroxyphenyl)-β-(m-carboxyphenyl)acrylonitrile. The infrared absorption spectrum shows maxima at 2.93, 4.48, 5.9, 6.26 and 6.6 microns. The compound has the structural formula

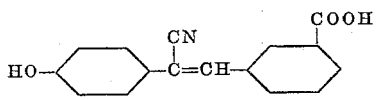

Example 8

A mixture of 262 parts of m-cyanobenzaldehyde and 266 parts of o-hydroxytolunitrile in 800 parts of methanol is stirred with a solution of 108 parts of sodium methoxide in 900 parts of methanol. After standing at room temperature for an hour, the reaction mixture is stirred and treated with a stream of gaseous hydrogen chloride. The precipitate is collected on a filter and freed from sodium chloride by washing with water. The α-(o-hydroxyphenyl)-β-(m-cyanophenyl)acrylonitrile forms fine lemon-colored rhomboid needles. The infrared absorption spectrum shows maxima at 2.82 and 4.50 microns.

A solution of 50 parts of this dinitrile in 1200 parts of 2-propanol and 500 parts of 10% aqueous sodium hydroxide is refluxed for 20 hours after which most of the 2-propanol is removed by vacuum distillation on the steam bath. The residue is diluted with 2500 parts of water and saturated with solid carbon dioxide to precipitate a small quantity of purely phenolic material. The latter is removed by extraction with ether and the remaining aqueous solution is carefully acidified with hydrochloric acid. A yellow precipitate forms which is collected on a filter and recrystallized from a dioxane-water mixture. An 0.5% sample in a potassium bromide disc shows infrared absorption at 2.93, 4.49, 5.89, 6.26, 6.60, 8.05, 8.50 and 12 microns. The α-(o-hydroxyphenyl)-β-(m-carboxyphenyl)acrylonitrile has the structural formula

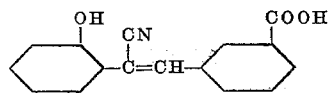

Example 9

A solution of 27 parts of sodium methoxide in 220 parts of methanol is added to a mixture of 66 parts of p-cyanobenzaldehyde and 68 parts of m,p-dihydroxytolunitrile in 200 parts of methanol. After standing for an hour, the mixture is slurried and treated with gaseous hydrogen chloride. The precipitate is then collected on a filter and freed from inorganic material by washing with water. The α-(m,p - dihydroxyphenyl)-β-(p-cyanophenyl)acrylonitrile can be purified by vacuum distillation at about 250° C. and about 0.005 mm. pressure. The infrared absorption spectrum shows maxima at 2.79, 4.49 and 6.26 microns.

A solution of 100 parts of this dinitrile in 2500 parts of 2-propanol and 1000 parts of 10% aqueous sodium hydroxide is refluxed for 24 hours and then concentrated under vacuum until most of the 2-propanol has been removed. The residue is diluted with 5000 parts of water and the resulting solution is saturated with carbon dioxide, washed with ether, and carefully acidified with dilute hydrochloric acid. The α-(m,p-dihydroxyphenyl)-β-(p-carboxyphenyl)acrylonitrile thus obtained is recrystallized in the form of yellow needles from a mixture of dioxane in water. The infrared absorption spectrum shows maxima at 2.95, 4.48, 5.9, 6.30, 6.60, 6.92, 7.27, 8.06, 8.42 and 11.96 microns. It has the structural formula

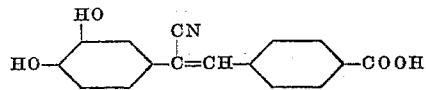

I claim:
1. A compound of the structural formula

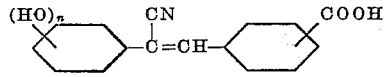

wherein $n$ is a positive integer smaller than three.

2. A compound of the structural formula

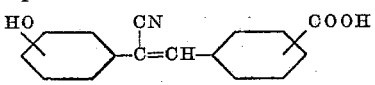

3. α-(p-hydroxyphenyl)-β-(p-carboxyphenyl)-acrylonitrile.

4. α-(p-Hydroxyphenyl)-β-(m-carboxyphenyl)-acrylonitrile.

5. α-(o-Hydroxyphenyl)-β-(m-carboxyphenyl)-acrylonitrile.

6. An α-(dihydroxyphenyl)-β-(carboxyphenyl)-acrylonitrile.

7. α-(m,p-Dihydroxyphenyl) - β - (p-carboxyphenyl)-acrylonitrile.

References Cited in the file of this patent
UNITED STATES PATENTS

| | | |
|---|---|---|
| 2,623,060 | Cragoe | Dec. 23, 1952 |
| 2,681,359 | Rorig | June 15, 1954 |